No. 819,380. PATENTED MAY 1, 1906.
J. SCHACHT.
THERMOMETER.
APPLICATION FILED DEC. 26, 1903.
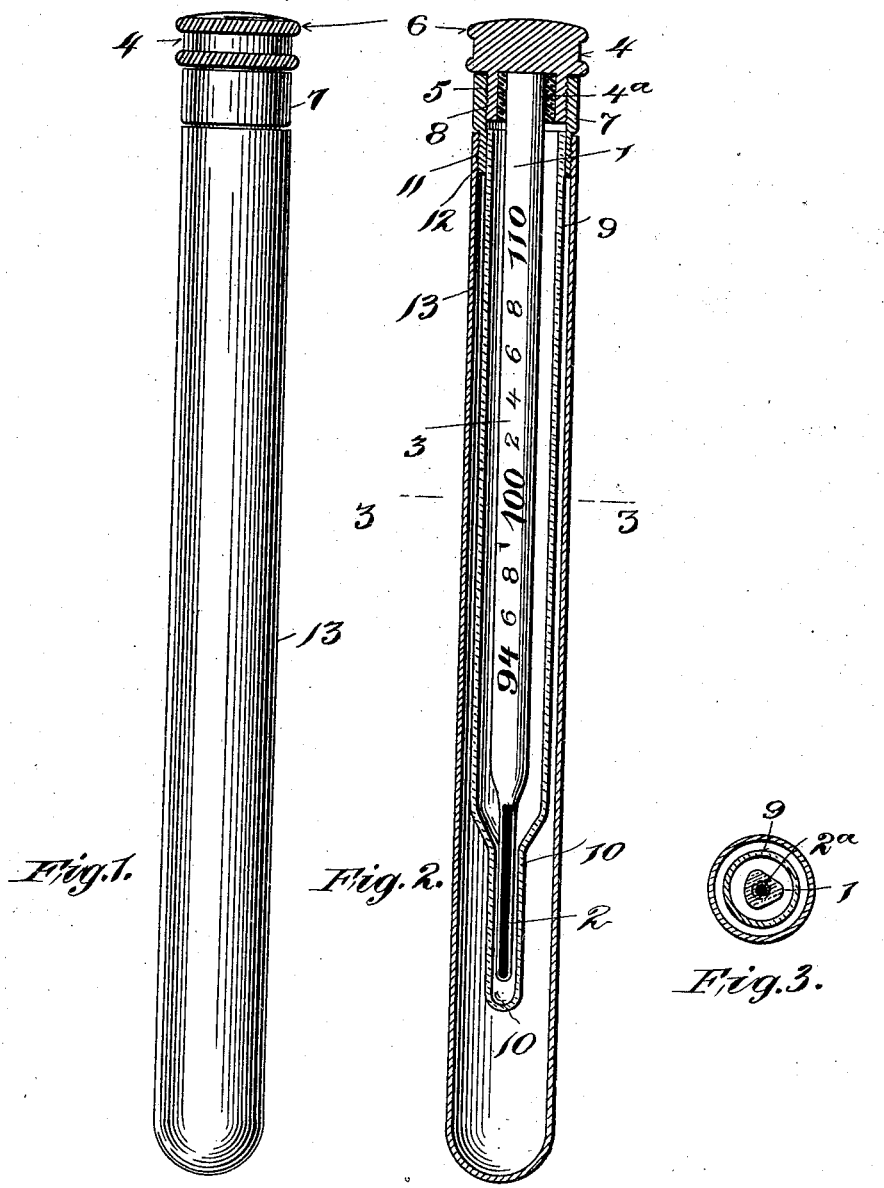

UNITED STATES PATENT OFFICE.

JULIUS SCHACHT, OF NEW YORK, N. Y., ASSIGNOR TO SOLOMON CHARLES HIRSCHBERG, OF NEW YORK, N. Y.

THERMOMETER.

No. 819,380.  Specification of Letters Patent.  Patented May 1, 1906.

Application filed December 26, 1903. Serial No. 186,535.

*To all whom it may concern:*

Be it known that I, JULIUS SCHACHT, a citizen of the United States, and a resident of the city and county of New York, borough of Manhattan, and State of New York, have invented a new and useful Improvement in Thermometers, of which the following is a specification.

The object of my invention is to provide an article of this class which will be simple, durable, and free from all danger of breakage when in use, and this I accomplish by providing the thermometer-tube with two movable protecting-casings—an outer one of metal, which is always removed when the instrument is in use, and an inner one of transparent glass, which may or may not be moved at the option of the person taking the reading.

For a more particular description of one embodiment of my invention reference is to be had to the accompanying drawings, in which—

Figure 1 is an elevation of the thermometer casings and cap. Fig. 2 is a longitudinal section of the thermometer provided with my improvements. Fig. 3 is a cross-section of the same, taken on the line 3 3 of Fig. 2.

Throughout the various views similar reference characters designate similar parts.

The thermometer 1 is provided at one end with the usual bulb or mercury-chamber 2 and capillary passage $2^a$ common to clinical thermometers and with the scale 3, which may be graduated as desired, although preferably between 94° and 110°. The other end of the thermometer-tube is provided with a metal cap 4, which is fixed to the tube in any suitable manner, as by cement or wax $4^a$. The lower end of the cap 4 is provided with external screw-threads 5 and above these with a knurled head 6.

A collar 7 with internal threads 8 is secured to the cap 4 by means of the threads 5, and fixed to this collar 7 is a glass tube 9, which incases the thermometer 1 and preferably fits with a quite snug fit about the bulb 2 and is reduced, as shown at 10, for this purpose. The amount of space between the bulb 2 and part 10 may be varied as desired, depending on the sensitiveness of the thermometer required when in use, it being understood that the well-known law of thermometers of this class is that their sensitiveness varies with the thickness of the glass and air about the bulb, other features being equal. Above the bulb 2 a free space is left between the tube 9 and thermometer 1. The glass tube is made detachable and transparent, so that the thermometer may be used either with or without the tube 9. While I have shown these parts as connected by a screw-threaded cap, it is obvious that this means of securing these parts may be varied and that any equivalent means may be employed. The collar 7 is also provided with external screw-threads 11, which engage internal threads 12 on a metallic casing 13, which incloses the tube 9 and protects it. The thermometer is always removed from this casing 13 when in use and may or may not be removed with the tube 9 at the option of the user.

While I have shown and described one embodiment of my invention, it is obvious that many others may be made which will utilize its advantages, and that my invention is broad enough to come within all structures that come within the scope of the annexed claim.

What I claim is—

A thermometer comprising a thermometric tube, a cap in which said tube is seated and by which it is carried, a depending collar on the said cap, having exterior and interior threads, a transparent interchangeable casing adapted to cover the said tube and secured to the interior of the said collar, and an exterior casing secured to the said collar by means of the said exterior threads.

Signed at the city, county, and State of New York this 24th day of December, 1903.

JULIUS SCHACHT.

Witnesses:
CHARLES G. HENSLEY,
SOPHIE SEKRSKY.